United States Patent
Stahl et al.

(10) Patent No.: US 9,722,484 B2
(45) Date of Patent: Aug. 1, 2017

(54) NOISE FILTERING (71) Applicant: NXP B.V., Eindhoven (NL)

(72) Inventors: Juergen Stahl, Herrieden (DE); Thomas Antonius Duerbaum, Baiersdorf (DE); Jens Goettle, Erlangen (DE); Alexander Pawellek, Stadtlauringen (DE); Anton Cornelis Blom, Eindhoven (NL); Hans Halberstadt, Groesbeek (NL); Frans Pansier, Nuenen (NL)

(73) Assignee: NXP B.V., Eindhoven (NL)

( * ) Notice: Subject to any disclaimer, the term of this patent is extended or adjusted under 35 U.S.C. 154(b) by 467 days.

(21) Appl. No.: 13/959,039

(22) Filed: Aug. 5, 2013

(65) Prior Publication Data
US 2014/0071719 A1 Mar. 13, 2014

(30) Foreign Application Priority Data
Sep. 13, 2012 (EP) .................... 12184309

(51) Int. Cl.
*H02M 1/15* (2006.01)
*H02M 1/12* (2006.01)
H02M 1/44 (2007.01)

(52) U.S. Cl.
CPC ............. *H02M 1/12* (2013.01); *H02M 1/15* (2013.01); *H02M 1/44* (2013.01); *H02M 2001/123* (2013.01)

(58) Field of Classification Search
CPC ............ H02M 1/12; H02M 1/15; H02M 1/44; H02M 2001/123

USPC ........ 363/37, 39, 44–47; 307/105, 106, 112, 307/552
See application file for complete search history.

(56) References Cited

U.S. PATENT DOCUMENTS

| | | | |
|---|---|---|---|
| 6,490,181 B1* | 12/2002 | Liu ................ | B29C 45/76 363/40 |
| 6,842,069 B2 | 1/2005 | Takahashi et al. | |
| 7,154,254 B2 | 12/2006 | Bray | |
| 7,405,528 B2* | 7/2008 | Ho ................. | H02M 1/44 318/400.25 |
| 7,595,687 B2* | 9/2009 | Mortensen ........ | H02M 1/44 327/551 |
| 2004/0017671 A1* | 1/2004 | Rajendran ........ | H05K 1/0216 361/764 |
| 2004/1008527 | 1/2004 | Honda | |
| 2004/0032753 A1* | 2/2004 | Liu ................ | B29C 45/76 363/39 |

(Continued)

FOREIGN PATENT DOCUMENTS

| | | |
|---|---|---|
| CN | 1851973 A | 10/2006 |
| DE | 3612380 A1 | 10/1987 |

(Continued)

OTHER PUBLICATIONS

Ogasawara, S. et al. "An Active Circuit for Cancellation of Common-Mode Voltage Generated by a PWM Inverter", IEEE Trans. on Power Electronics, vol. 13, No. 5, pp. 835-841 (Sep. 1998).

(Continued)

*Primary Examiner* — Adolf Berhane (57) ABSTRACT

A noise filter circuit uses open loop signal processing to process the signal that causes the noise and generate a signal to be fed back into the system to cancel noise currents.

14 Claims, 8 Drawing Sheets

(56) References Cited

U.S. PATENT DOCUMENTS

| | | | | |
|---|---|---|---|---|
| 2008/0285315 A1* | 11/2008 | Lee | ......................... | H02M 1/44 363/44 |
| 2009/0027136 A1* | 1/2009 | Traa | ....................... | H03H 11/10 333/12 |
| 2013/0235628 A1* | 9/2013 | Dong | .................... | H02M 7/797 363/47 |

FOREIGN PATENT DOCUMENTS

| | | |
|---|---|---|
| DE | 10 2005 004177 A1 | 8/2006 |
| DE | 10 2011 013247 A1 | 3/2012 |

OTHER PUBLICATIONS

Cochrane, D. et al. "Passive Cancellation of Common-Mode Noise in Power Electronic Circuits", IEEE Trans. on Power Electronics, vol. 18, No. 3, pp. 756-763 (May 2003).

Son, Y. et al. "Generalization of Active Filters for EMI Reduction and Harmonics Compensation", 38th IAS Annual Mtg. Conf. Record of the IEEE Trans. on Ind. Appl., vol. 42, No. 2, pp. 1209-1214 (Oct. 12, 2003).

Katzir, L. et al. "Reduction of Common-Mode Electromagnetic Interference in Isolated Converters Using Negative Feedback", IEEE 24th Conv. on Electrical and Electronics Engineers in Israel, pp. 180-183 (Nov. 2006).

Chen, W. et al. "A Novel Hybrid Common-Mode EMI Filter With Active Impedance Multiplication", IEEE Trans. on Industrial Electronics, vol. 58, No. 5, pp. 1826-1834 (May 2011).

Extended European Search Report for European Patent Appl. No. 12184309.8 (Feb. 1, 2013).

Communication pursuant to Article 94(3) EPC for application 12 184 309.8 (Jan. 14, 2016).

Hamza, Djilali; "Conducted Electromagnetic Interference Mitigation Using Active Filtering Method in DC/DC Converters"; Mater of Science, Univerity of Montreal; English translation through out and beginning p. 23; 139 pages (2006).

Wang, Shuo et al; "Investigation of Hybrid EMI Filters for common-Mode EMI Suppression in a Motor Drive System"; IEEE Transactions on Power Electronics, vol. 25, No. 4; pp. 1034-1045 (Apr. 2010).

\* cited by examiner

NOISE FILTERING

CROSS-REFERENCE TO RELATED APPLICATIONS

This application claims the priority under 35 U.S.C. §119 of European patent application no. 12184309.8, filed on Sep. 13, 2012, the contents of which are incorporated by reference herein.

This invention relates to noise filtering, in particular electromagnetic interference ("EMI") filtering, which is used to provide electromagnetic compatibility. Electromagnetic compatibility ("EMC") refers to measures which ensure that systems will not interfere with or prevent each other's correct operation through spurious emission and absorption of EMI.

Electromagnetic compatibility is an important issue. One reason is to enable the compliance with international standards. In addition, the increasing electromagnetic noise susceptibility in digital circuits contributes to the importance of this topic.

Filters are used to reduce EMI noise. Most of the filters that are used to reduce EMI noise are passive. These filters are robust, but take a lot of space on a printed circuit board (PCB) compared to the function performing parts of the device. In addition, the energy consumption of passive filters cannot be neglected and this reduces the efficiency of the whole system. There are filter techniques such as passive cancellation which can be smaller, for example as disclosed in Cochrane, D.; Chen, D. Y.; Boroyevic, D.: Passive cancellation of common-mode noise in power electronic circuits, in: IEEE Transactions on Power Electronics 18 (2003), Nr. 3, S.756-763

Nevertheless, these EMI noise reduction techniques still have problems. Passive cancellation for example uses mostly coupled inductors in combination with capacitors. In terms of common mode (cm) noise, both the inductor and the capacitor(s) have to fulfil safety requirements. For this reason, so-called "y-capacitors" are used.

In order to provide a proper noise-cancelling signal, the coupled inductor and the capacitor have to be adjusted properly. Typically, small capacitances which are not available as standard components are necessary for an optimal common mode noise cancellation. Otherwise the amplitude of the generated signal will not match the original noise signal. Therefore, variable capacitors are needed. However, these components are not available as y-capacitors. Hence, fixed valued capacitors have to be used that lead to a mismatch causing rapid degradation of the filtering effect.

Another problem is the limited obtainable bandwidth in practical set-ups with the currently well-known passive cancellation techniques. The techniques typically work properly up to around 1 MHz, whereas the conducted EMI noise needs to fulfil standards up to 30 MHz. Hence, there is a need to increase the operating bandwidth Active filters are a promising alternative to passive filters, especially in terms of PCB space and efficiency. Hence, a usage of these filters is preferable. However, closed loop controlled active EMI circuits are difficult to handle in terms of stability and performance.

According to the invention, there is a circuit as claimed in claim 1.

The invention provides a noise filter circuit for a power converter, comprising:

a sensor coupled to a switching node of the power converter, wherein the voltage on the switching node comprises a switch waveform which gives rise to current noise as a result of parasitic capacitance;

a processing stage for processing the sensor signal and for providing a correction signal to a voltage line associated with the power converter thereby to reduce the current noise.

This defines an open loop control path for an EMI noise canceller. The processing stage can be an active circuit, i.e. including an amplifier. The noise cancellation can be considered to be a feed forward mechanism.

The sensor comprises a sensor reference point which can be protective earth, a negative rail of the dc bus, the lower rail of a bridge rectifier output, or any other suitable point. The circuit defines an EMI filter that is able or helps to fulfil EMI regulations of electronic equipment.

The concept underlying the operation of the circuit is to provide direct sensing of the signal that causes the common mode EMI noise, if necessary multiplying the sensed signal, and feeding it back into the system. A phase shift of 180 degrees can be used to provide a cancellation function so that part of the original noise and the injected noise cancel, and the total EMI noise will be reduced. The 180 degree phase shift can be implemented in various ways depending on the circuit configuration.

The system is open loop controlled. Hence, no stability issues will occur. This circuit is particularly suitable for EMI filtering. Very small and effective EMI filters are enabled without any stability problems.

The voltage line to which the correction signal is applied can comprise:

a protective earth; or an ac neutral and/or ac phase line at an input to the converter; or a dc voltage supply line.

The voltage line to which the correction signal is applied depends on the way the power converter and the processing stage (for example sensor amplifier) is referenced. For example:

the sensor and amplifier stages can be supplied by a power source which is referenced to a protective earth, and the voltage line (to which the correction signal is applied) then comprises an ac neutral and/or ac phase line at an input to the converter or a dc voltage supply line; or the sensor and amplifier stages can be supplied by a power source which is referenced to an ac neutral or an ac phase line at an input to the converter, and the voltage line (to which the correction signal is applied) comprises a protective earth; or the sensor and amplifier stages can be supplied by a power source which is referenced to circuit ground, and the correction signal is provided to a voltage line comprising a protective earth.

Thus, the term "voltage line" is intended to cover a line on which a set dc voltage is present, a varying ac voltage or indeed a reference ground potential such as protective earth or circuit ground.

In these possible arrangements, the power supply to the amplifier can comprise positive and negative voltage sources which connect together at an intermediate node which defines the reference, although single rail amplifiers can be used as well.

The processing stage can comprise an amplifier, and this can provide an adjustable multiplication to adjust the amplitude of the feedback signal. It is possible to use resistors for the adaption of the multiplication factor. Hence, standard components can be used. In addition, it can be implemented as an active cancellation method that does not need any bulky passive filter components.

The sensor can generate an output voltage dependent on the voltage at the switching node. The processing stage then can comprise a voltage amplifier and a feeding stage for injecting a current dependent on the voltage amplifier output.

This provides a voltage sensing and voltage driven current injection. The amplifier can be non-inverting or inverting.

The sensor can instead generate an output current dependent on the voltage at the switching node, e.g. the voltage itself or its derivation. This provides a current sensing approach, and the processing stage can then comprise a current amplifier and a feeding stage for injecting a current dependent on the current amplifier output.

For voltage sensing, the input impedance of the amplifier should be very high, whereas a low input impedance of the amplifier is desired for current sensing.

The current can be injected to the phase and the neutral of a mains supply to the DC-DC converter. This cancels the common mode noise on both mains supply lines. In another implementation, the current is injected to the dc supply lines. For example, the current can be injected to the circuit ground line and the positive supply line. The common mode cancellation current is injected in both lines of the supply, by the very nature of the fact that it is common mode. The DC supply is the DC voltage after the rectifying bridge, or the genuine DC supply voltage in case of a converter which is connected to such a supply (e.g. in industrial environments)

The circuit can comprise a plurality of power converter stages. Each power converter can have an associated sensor, and a combination of the sensor signals is processed by the processing stage.

Examples of the invention will now be described in detail with reference to the accompanying drawings, in which.

The invention provides a noise filter circuit for a power converter, in particular a switch mode power converter such as a DC-DC converter, comprising a sensor coupled to a switching node of the power converter. The sensor signal is processed to derive a signal to be supplied to one or more voltage lines associated with the power converter or to protective earth thereby to reduce the noise.

Figure 1A:
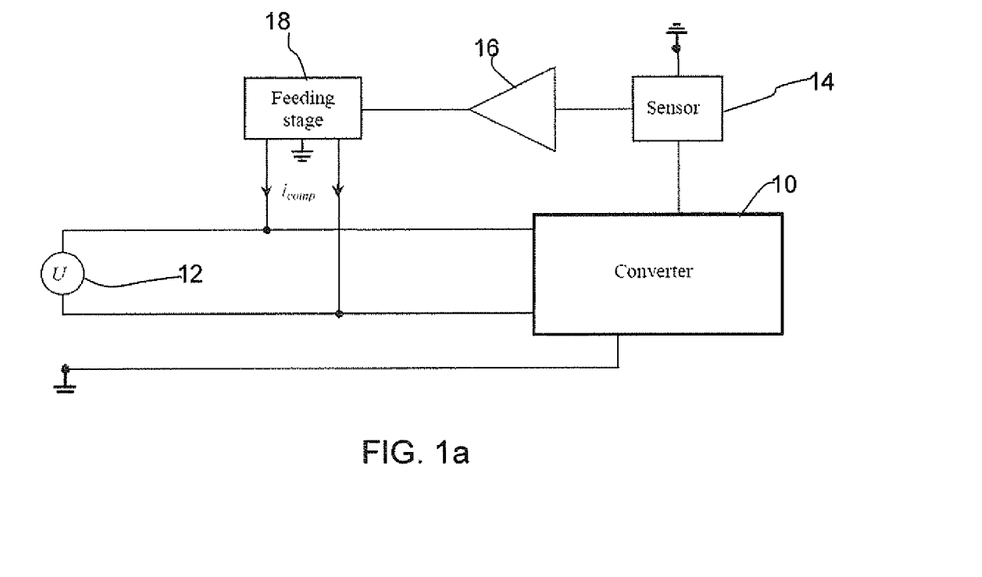
FIGS. 1a and 1b show the basic idea of common mode (Cm) noise reduction for a single phase switch mode power supply.
Figure 1B:
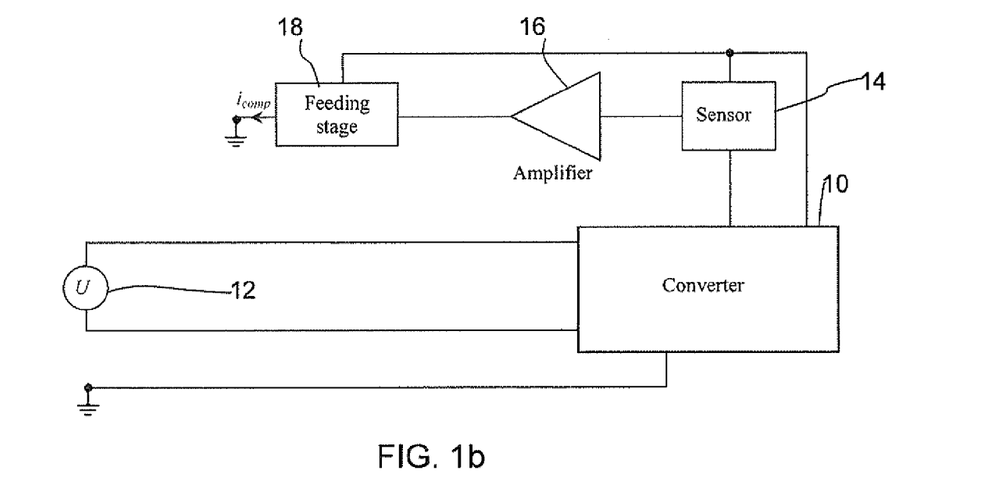

FIGS. 1a and 1b show the basic principle of the invention for common mode (cm) noise reduction for an arbitrary converter 10 and an arbitrary input voltage (ac, dc, bridge) as represented by the voltage source 12. The voltage source 12 supplies the converter, which in turn generates an output voltage due to high frequency switching of the converter, thus creating a switching node. The principle can be applied to any converter/inverter with any kind of input voltage.

The switching node is the node at which a current is selectively routed through the switch of the power converter (to allow build-up of inductor current). When the switch is open, the inductor current flows through a diode to the output. This general definition of the switching node applies to all switch mode converters, and examples of boost and flyback converters are given below.

The active EMI filter consists of a sensing unit 14, which is either a voltage sensor or a current sensor, an amplifier 16 for voltage multiplication or for enabling suitable current output levels, and a feeder 18 to feed the generated signal back into the system.

In a typical feedback approach, a signal is monitored (such as the EMI noise current) and this is used to modify the input (such as the voltages on the power supply lines) in order to continuously adapt the monitored signal to make it reach or stay at target levels. The approach of the invention also involves sensing, however, of the noise producing voltage (i.e. at the switching node) and modification of the input (i.e. the mains supply lines), but not in a closed loop. Instead, the modification is based on open loop control.

In particular, the circuit provides direct sensing of the signal that causes the common mode EMI noise. This signal is the voltage on the switching node, since the voltage is converted into current noise spikes because of differentiation by parasitic capacitances to protective earth. The sensed signal (the voltage on the switching node) is processed before being fed back into the system. The processing provides for a 180° phase shift in respect of the current signal to be injected back into the system. Because the system is open loop controlled, no stability issues will occur.

The amplifier 16 can have an adjustable multiplication factor. This can be easily used to adjust the amplitude of the feedback signal. It is possible to use resistors for the adaption of the multiplication factor. Hence, standard components can be used. In addition, the circuit provides an active cancellation method that does not comprise any bulky passive filter components.

In FIG. 1a, the supply sources of the feedback system (amplifier 16 and feeding stage 18) are referenced to protective earth and the fed back signal is combined with the converter power supply lines (which may be dc or ac).

In FIG. 1b, the supply sources of the feedback system (amplifier 16 and feeding stage 18) are referenced to a voltage line other than protective earth of the converter 10 (such as an ac phase or neutral line, or a dc voltage supply line or even circuit ground) and the fed back signal is combined with the protective earth.

Thus, when the supply sources are referenced to protective earth, the feedback is into the mains lines or dc supply lines. When the supply sources are referenced to a voltage line other than protective earth of the converter (such as an ac phase or neutral line, or a dc voltage supply line) the injection is to protective earth.

The same reference numbers are used in different figures to denote the same components.

It will be apparent from the two schematic examples of FIGS. 1a and 1b that various circuit designs are possible, and several designs are shown and discussed below. The fundamental concept underlying the operation of the circuit remains the same in all examples, so a detailed outline of the circuit operation will be given for the first example only.

Figure 2:
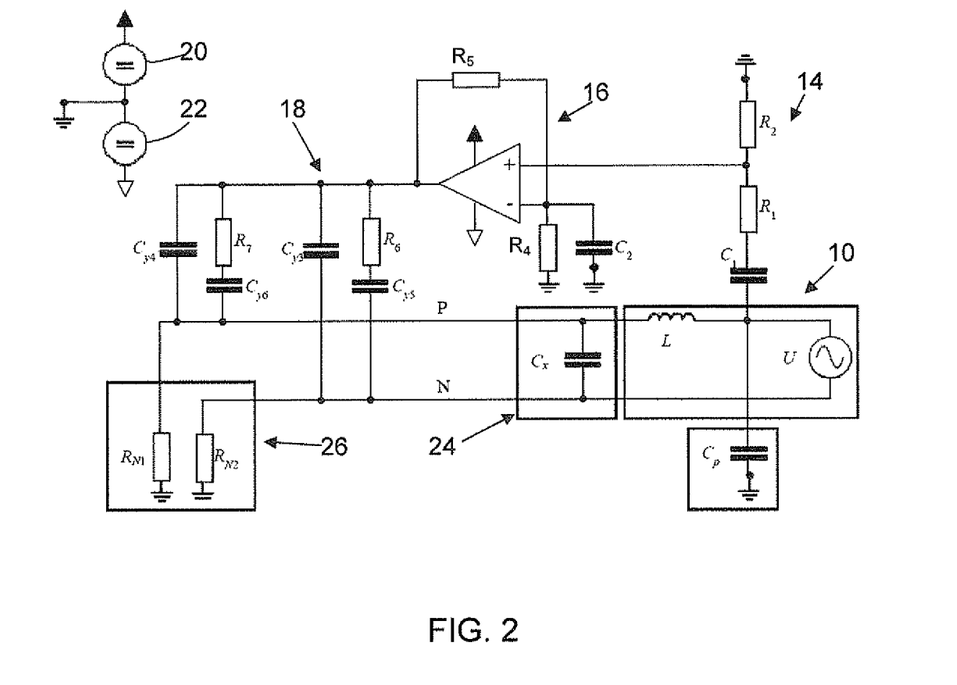
FIG. 2 shows Cm noise reduction with voltage sensing for a boost converter with the voltage supplies which provide the amplifier supply voltages referenced to protective earth

FIG. 2 shows a first possible implementation of the basic circuit together with a noise model of a boost converter 10. Any other kind of noise model or converter can be used as well.

FIG. 2 shows the circuit and how to connect it to the power converter stage 10. For this implementation, the supply sources of the active filter 20/22 are referenced to protective earth. By this is meant that the positive and negative power supplies 20, 22 are connected together at protective earth, and these power supplies provide the power for the amplifier 16. Of course also a single supply source can be used in the case of a so-called single rail amplifier.

The sensor 14 comprises a resistor divider formed by resistors R1 and R2 coupled to the switching node of the converter by capacitor C1. Additional capacitors in parallel to $R_1$ and $R_2$ are possible to compensate for any input capacitance of the amplifier 16. The capacitor C1 is a blocking capacitor, connected between the switching node of the converter 10 and the resistor divider. Depending on the resistors, $C_1$ might be a y-capacitor.

By way of example, the switching frequency of the converter is typically in the range 30 kHz to 130 kHz, and the EMI noise to be filtered according to regulations typically starts at 150 kHz.

The voltage signal on the switching node can for example be a square wave voltage waveform. The waveform edges give rise to current spikes as a result of differentiation by parasitic capacitances which couple to protective earth, shown as the parasitic capacitor Cp.

Instead of measuring the current spikes, the voltage at the switching node is used as a feedback signal. After dividing by the resistive divider 14, the voltage is provided to a non-inverting amplifier 16 with gain defined by a feedback resistor R5 and input resistor R4. The feedback resistor R5 or resistor R4 can be chosen to obtain an optimal gain for the highest attenuation of the common mode noise. Thus, resistors R4 and/or R5 can be used for gain adjustment.

It is also possible to set the multiplication to a specific value in order to obtain a maximum bandwidth and do the adjustment for highest attenuation via the sensor (resistors R1 and R2).

The feeding stage 18 essentially converts the output of the amplifier 16 to a current, so that current summing nodes can be used to couple a signal to the mains lines (P and N). In a simplest implementation, the feeding stage can comprise a capacitor between the amplifier output and each mains line. This differentiates changes in voltage at the amplifier output to derive injection currents which aim to cancel the current through the parasitic capacitance. However, in the example shown, the feeding stage comprises more complicated filter circuits. These filter circuits each comprise two parallel legs, one with the noise cancelling filter Cy3, Cy4, and one with an RC filter R7-Cy6, R6-Cy5. The legs containing the noise cancelling capacitors Cy3 and Cy4 are for converting the output voltage to a current for injection into the supply as outlined above.

There might also be a non-negligible noise current due to C1, R1, and R2. In that case, the legs containing the RC filter circuits Cy5, R6 and Cy6, R7 are provided. These circuits can be designed to provide fine tuning of phase adjustments.

A capacitor C2 is provided between the inverting input of the amplifier and protective earth. This can also be used for an additional phase adjustment of the cancellation current. Depending on the value of R1, the capacitor C1 has to be a y-capacitor or just a regular capacitor.

A differential mode filter capacitor 24 is provided at the input of the converter 10 for filtering differential mode noise. However, other differential mode noise cancellation systems can be employed.

The sensor, amplifier and feeding stage essentially together implement a 180 degree phase shift so that the injected currents cancel the common mode noise resulting from the parasitic capacitance Cp.

In particular, the circuit is designed so that a rising edge in the converter switching node causes a current spike through the parasitic capacitance in one sense. The processing of the same voltage rising edge results in a cancelling current injection. For example, a positive current spike from the switching node to protective earth is compensated by a positive current spike from the output of the amplifier 16 to the feeding stage 18. Thus, this circuit requires a non-inverting amplifier.

FIG. 2 shows a line impedance stabilisation network 26. This is used as a measuring tool during development and testing of the circuit, and is not present in the eventual power supply circuit (and is not shown in FIG. 1). The correct circuit values are determined by testing using the line impedance stabilisation network 26.

The basic operation of the circuit thus involves the use of an open loop feedback path between the switching node of the converter and the mains input lines.

The technique presented in FIG. 2 can also be implemented with current sensing. The corresponding circuit is shown in FIG. 3.

Figure 3:
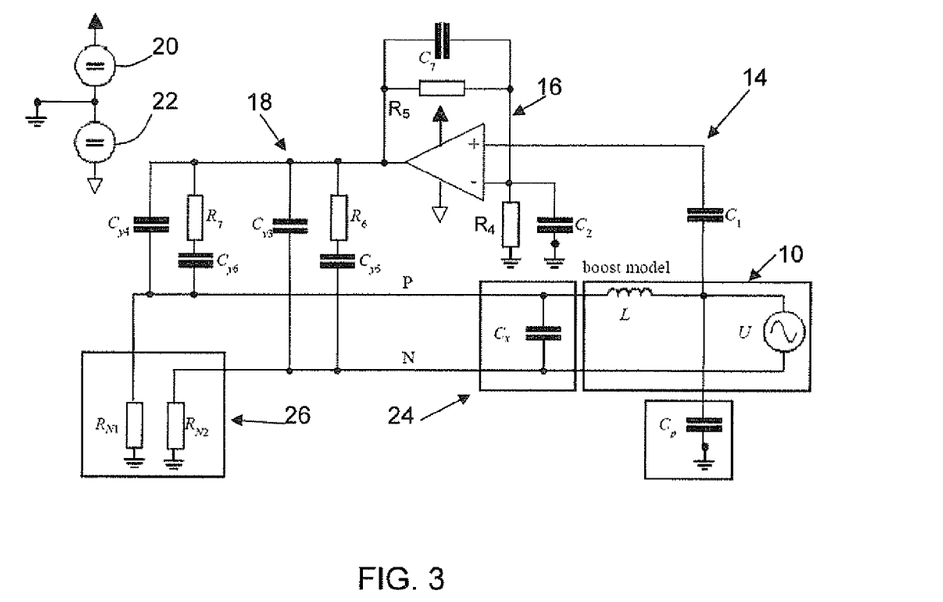
FIG. 3 shows Cm noise reduction with current sensing for a boost converter with the supply sources referenced to protective earth

FIG. 3 differs from FIG. 2 only in that the resistive divider is not used, and the amplifier performs current to voltage conversion, by providing a low ohmic input impedance. Thus, the current to voltage conversion takes place at the amplifier rather than at the sensor. The resistors R4 and R5 again define the gain setting of the amplifier. The gain can in fact be unity, and the purpose of the current amplifier is to provide sufficient output current capability to generate the injection current. The capacitor $C_7$ might be necessary for proper phase adjustment.

In this case, the capacitor C1 is not only a blocking capacitor. The capacitor C1 provides the derivative of the voltage at the switching node, and the current is sensed via an amplifier 16 with current input.

A circuit with a very high value of capacitor C1 is impractical, as then the full voltage at the switching node (depicted as voltage U) appears at the input of the amplifier. In FIG. 2, this voltage is divided by the resistive voltage divider. Due to the parasitic input capacitance of the amplifier it is difficult to make this frequency independent.

The use of an amplifier with a current input enables the resistive divider to be omitted. The input impedance of the amplifier is virtually zero. Assuming, as a consequence, the voltage at the non-inverting input of the amplifier to be zero, the full voltage swing of U appears across C1 itself. Given the relation $I=C*(dVc/dt)$, the parameter that drives the input is a current. The amplitude of that current is therefore determined by the value of C1, and the actual parameter sensed by the input of the sensing amplifier is a current.

This current is proportional or at least nearly proportional to the EMI current flowing through Cp. This will be the case when both values are exactly the same. Mismatch can be compensated for by adjusting the gain of the amplifier. The bandwidth of a current driven amplifier is typically much higher than that of a voltage driven amplifier.

In the example shown, the output of the amplifier 16 is a voltage output, but a current amplifier can be used, in which case it becomes possible to directly feed the signal back into the system using a current output.

For the voltage output as shown, a phase shift of 90° is implemented before feeding the signal back into the system since the differentiation introduced by the capacitors Cy4 and Cy3 add 90°. These feeding capacitors form a differentiating network, and in order to have the correct phase relationship, the amplifying stage has a 90 degree phase shift formed by the integration action inherently to the current-to-voltage transfer.

Capacitor C1 in this case is implemented as a y-capacitor.

In the example of FIG. 3, the same mechanism for coupling the amplifier output voltage as a current to inject to the mains lines is shown.

Figure 4:
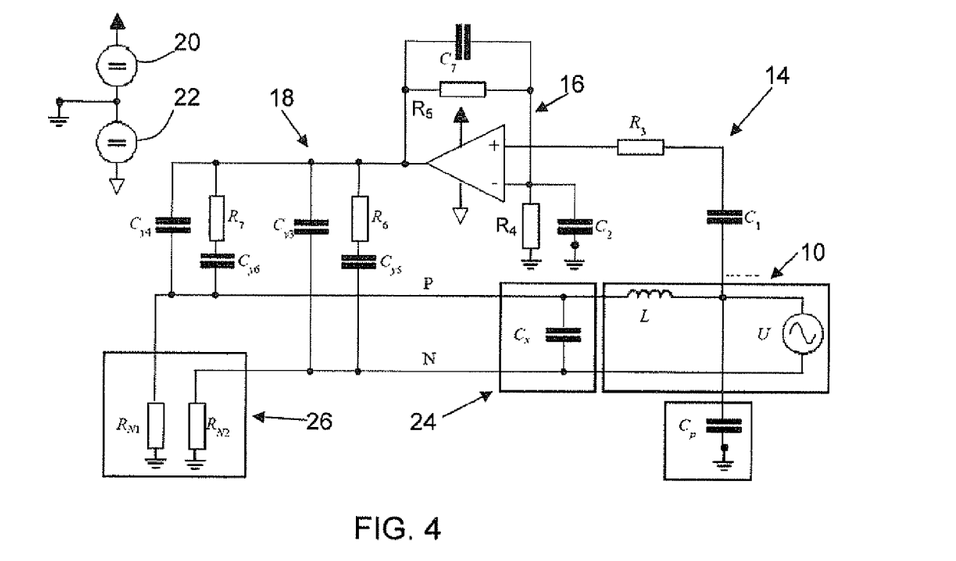
FIG. 4 shows Cm noise reduction with current sensing proportional to the voltage for a boost converter.

A sensing of a current proportional to the voltage is possible as well. FIG. 4 shows a corresponding realization. This differs from FIG. 3 only in that resistor R3 is provided between the capacitor C1 and the input to the amplifier. In this case, C1 is only necessary for DC blocking and protection. It is implemented as a y-capacitor. The capacitor C1 is for blocking the low frequency components as in the example of FIG. 2 (e.g. dc, 100 Hz). For voltage sensing, the input impedance of the amplifier should be very high, whereas a low input impedance of the amplifier is necessary for current sensing. Additional elements, such as capacitor C7 can be used for a proper phase adjustment in order to cancel the cm noise properly. C7 combines with R5 (which is present to form a frequency independent divider from output to inverting input) to enable phase adjustment to be made.

In the examples of FIGS. 2 to 4, the voltage sources (for supplying the amplifier for example) are referenced to a protective earth. This means that additional auxiliary power supplies are needed. Even in case these auxiliary power supplies can be derived from auxiliary windings on any magnetic component of the converter, quite some additional safety precautions have to be taken into account. A circuit which is easier to implement uses supply sources referenced to any voltage line other than protective earth (such as an ac phase or neutral line, or dc voltage supply lines).

Figure 5:
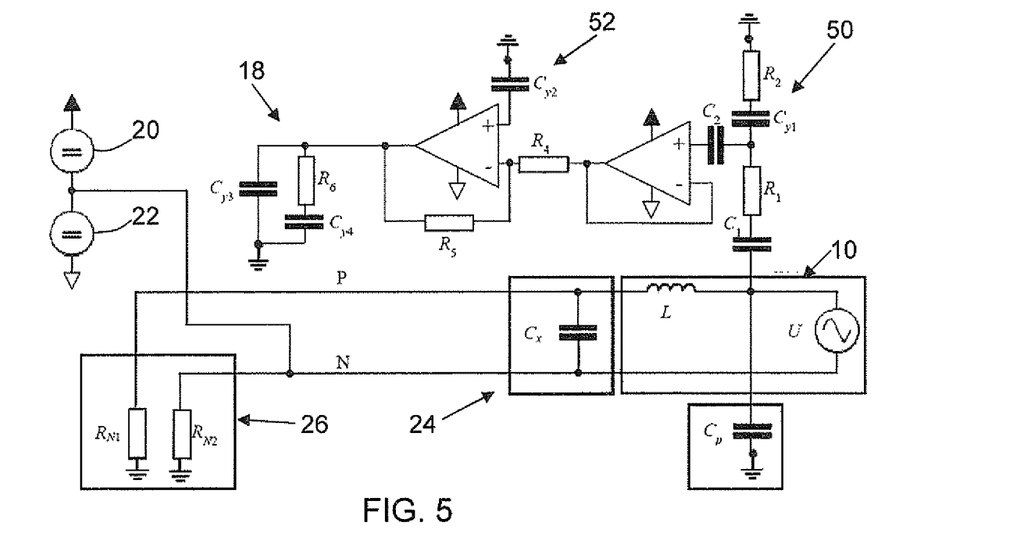
FIG. 5 shows Cm noise reduction with voltage sensing for a boost converter with the supply sources coupled to neutral N.

An implementation for this is presented in FIG. 5. As shown, the power supplies 20,22 are connected together to the neutral line N rather than to the protective earth. This results in other modifications to the circuit.

In particular, FIG. 5 shows a two stage amplifier comprising a non-inverting stage 50 and an inverting stage 52. The non-inverting stage 50 performs the function of sensing with high input impedance, while the inverting stage 52 performs the (adjustable) amplification. Using two stages improves performance. In case the amplifier has sufficiently high impedance, the first stage can be omitted. The overall amplifier needs to be inverting due to feeding to protective earth.

A y-capacitor Cy1 is shown at the connection to protective earth of the resistor divider. This is needed because the power supply for the amplifier is no longer referenced to protective earth. The non-inverting stage is coupled to the resistive divider R1,R2, but an additional capacitor C2 is shown at the non-inverting input for dc blocking. This is only necessary if C1 and Cy1 are not adjusted properly.

The inverting stage 52 performs an inverting amplification function, with the multiplication factor determined by the resistors R4,R5. The non-inverting terminal is connected to protective earth by a y-capacitor Cy2.

These y-capacitors Cy1 and Cy2 are provided for any connections to the protective earth, and these are appropriate for safety reasons when the power supply of the active filter is referenced to the mains (or to a dc bus).

The eventual output of the amplifier circuit is provided to a feeding stage 18 which is the form of one of the filter circuits of FIG. 2, namely a capacitor Cy3 for voltage to current conversion and an RC filter R6-Cy4. This filter circuit connects to the protective earth, so again y-capacitors are used.

The feeding stage does not couple current into the mains lines in this case, but couples the current to the protective earth. There is thus essentially a feedback path through the protective earth which provides the cancellation of the EMI noise.

When the supply sources are referenced to protective earth as in FIG. 4, the injection is into the mains lines or the dc bus lines. When the supply sources are referenced to a mains terminal or a dc bus line as in FIG. 5, the injection is to protective earth. This follows from consideration of the current direction, taking into account that the actual driving current is supplied from the supply sources of the amplifier/driver.

FIG. 5 shows a circuit with voltage sensing. Current sensing, however, is possible as explained above.

Figure 6:
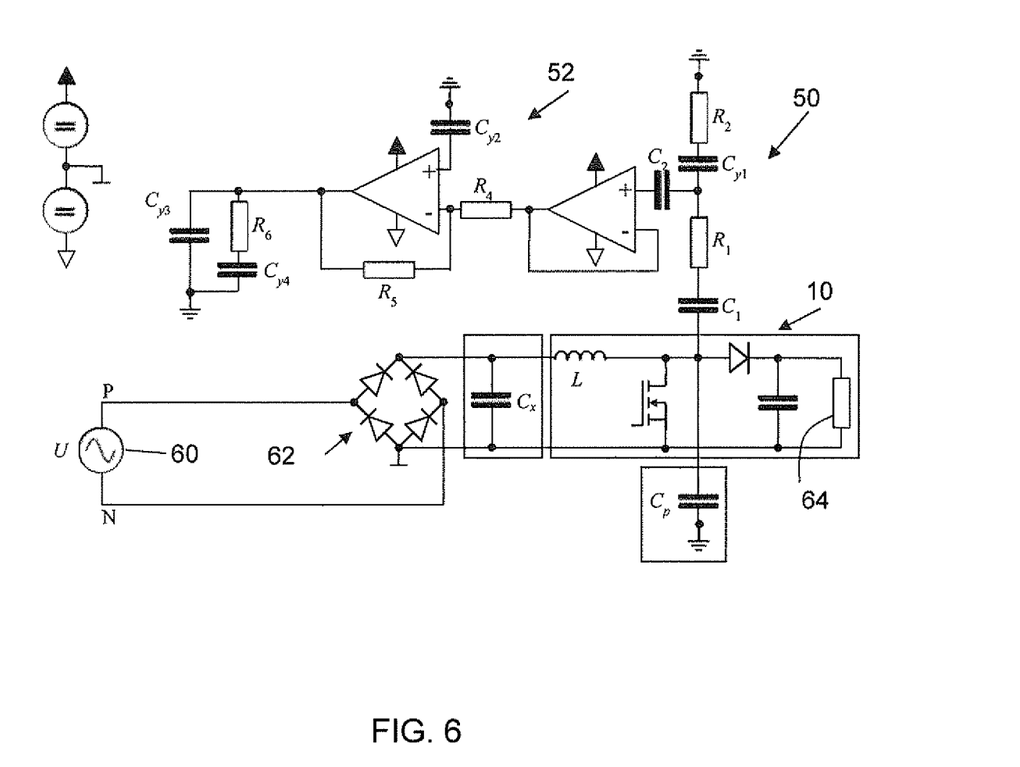
FIG. 6 shows Cm noise reduction with voltage sensing for a complete boost converter with the supply sources coupled to circuit ground or minus of the converter.

FIG. 6 shows a possible structure showing the boost converter circuit connected to the mains (instead of showing only a noise model). Only one possible boost converter is shown but known variations are possible. The boost converter comprises an inductor between the input and the switching node. A transistor controls the charging of an output capacitor through a diode using the inductor current.

In FIG. 6, the supply sources are referenced to circuit ground. FIG. 6 shows an example of circuit as would be used in a power supply, i.e. without the line impedance stabilisation network. Instead, a single phase mains supply 60 connects to a full wave rectifier 62 before supplying the converter (and its associated load 64).

As mentioned above, the circuit can also be used for multiple converters.

It is also possible to share the feedback path (sensor, amplifier and feeding stage) between the multiple converters.

Figure 7:
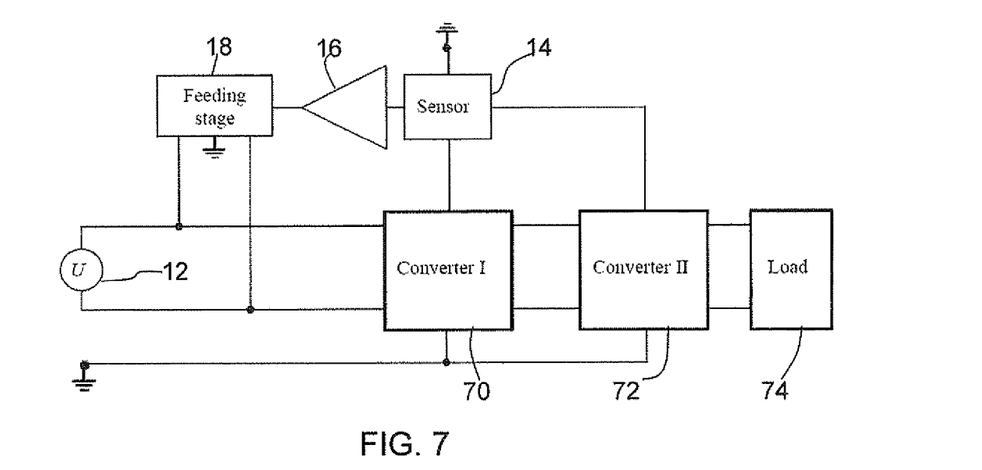
FIG. 7 shows the basic idea of Cm noise reduction for a single phase switch mode power supply with two converters.

FIG. 7 shows a general block diagram for a two stage switch mode power supply consisting of two converters 70,72. It shows the output load 74, and shows that the sensor 14 generates a sensed signal based on the switching nodes of both converters 70,72. Otherwise, the circuit is the same as in FIG. 1. Thus, the only difference lies in the sensing.

Figure 8:
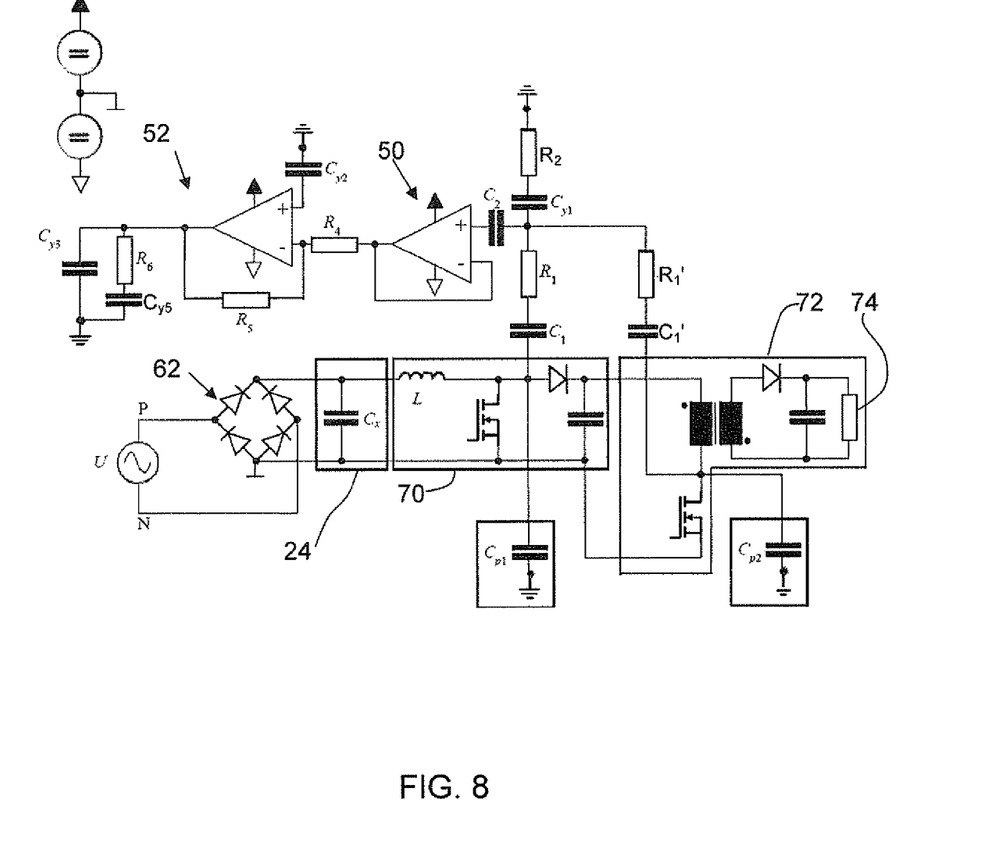
FIG. 8 shows Cm noise reduction for two converters with voltage sensing for a boost and a flyback converter.

FIG. 8 shows a first implementation, for using voltage sensing for a series connection of a boost converter 70 and a flyback converter 72 at the mains. The example is again based on the supply sources being referenced to the phase or neutral line or circuit ground of the converter or any dc bus line.

In FIG. 8, the voltage detection is based on a voltage divider which comprises one resistor R2 connected from the output of the divider to protective earth (through the capacitor Cy1) and one resistor between the output of the divider and each converter switching node; resistors R1 and R1'. Thus, there are effectively two divider circuits (R1,R2 and R1',R2) with one common resistor R2. The capacitors C1 and C1' perform the same dc blocking function as outlined above. Each converter 70,72 is shown associated with its own parasitic capacitors Cp1 and Cp2 to protective earth. The remainder of the circuit is the same as FIG. 6, so that FIG. 8 also shows a two stage amplifier 50, 52 of a non-inverting stage 50 and an inverting stage 52.

The choice of the resistors R1, R1' and R2 determines the way the two switching node voltages are combined to derive the single sensor output, to be used for EMI noise cancellation.

Figure 9:
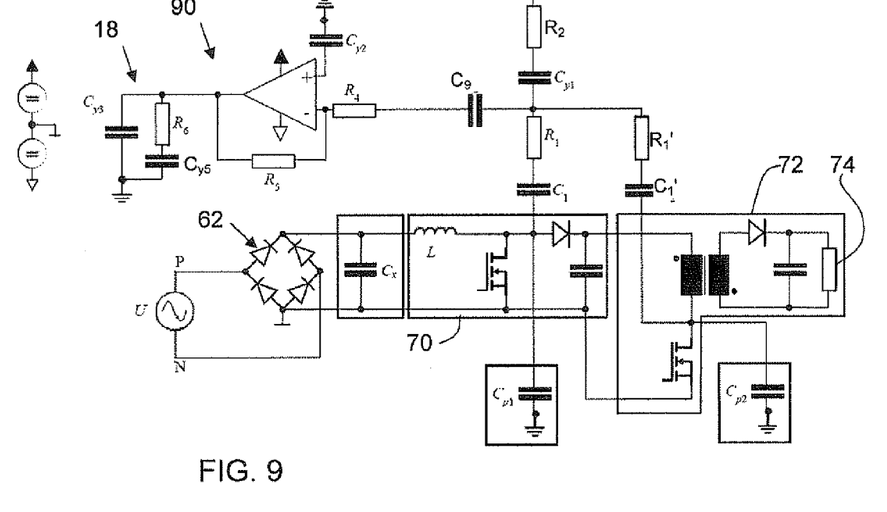
FIG. 9 shows Cm noise reduction for two converters with voltage sensing and only one amplifier for a boost and a flyback converter.

In FIG. 9, a single stage inverting amplifier is used (which is the same as amplifier stage 52 in FIG. 5, FIG. 6 and FIG. 8). The single stage amplifier is exemplarily a voltage amplifier. The purpose of C9 is to guarantee the proper DC blocking. This is the same function as C2 in FIGS. 5 and 6.

Figure 10:
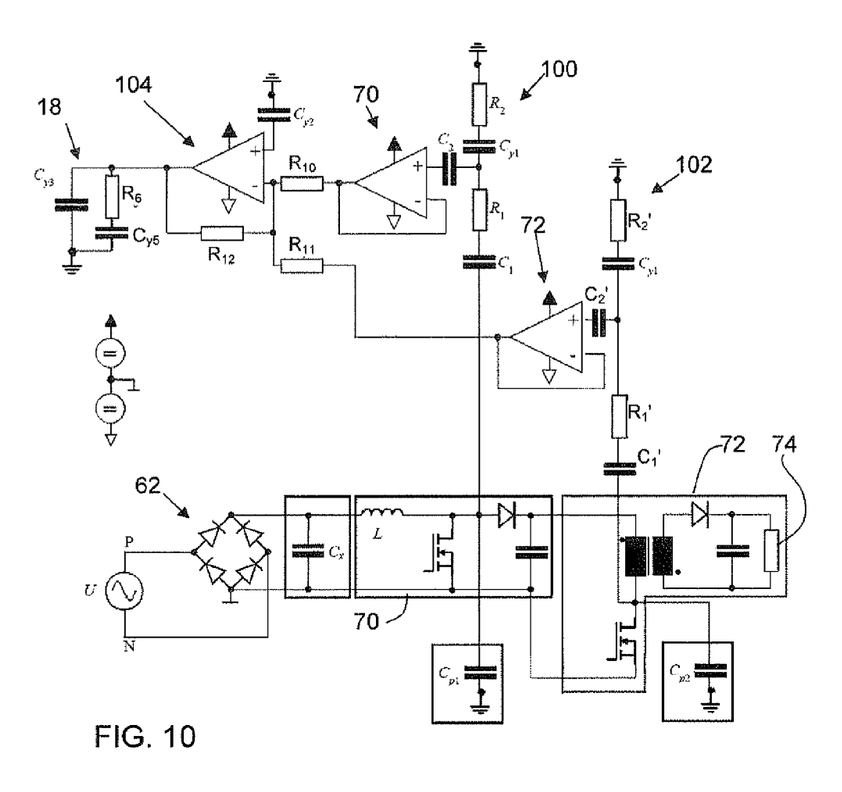
FIG. 10 shows Cm noise reduction for two converters with two voltage sensing devices for a boost and a flyback converter.

FIG. 10 shows a variation with two independent voltage sensing legs, each with their own amplifier, together with an addition of the two obtained signals.

The first amplifier 70 has a sensor 100 (of exactly the same configuration as the first amplifier stage 50 in FIGS. 5 and 6). It comprises a single non-inverting amplifier with a resistor divider R1,R2 and capacitors Cy1 and C1.

The second amplifier 72 has a sensor 102 of exactly the same configuration. It comprises a single non-inverting amplifier with a resistor divider R1', R2' and capacitors Cy1' and C1'.

The outputs from the two amplifiers 70,72 are added by an adding amplifier 104. The weighting factors applied in the addition can be set by the resistors R10, R11 and R12 forming the adder circuit alternatively these weighting factors can be provided by R1, R2 or R1', R2'. The output is again converted to an injection current by a single feeding stage 18.

In all three examples of FIG. 8, FIG. 9 and FIG. 10 there is only one feeding stage 18 coupled to protective earth. However, the active filter is able to reduce the noise of two different converters. For this purpose, the sensing stage has to be adapted to each converter, and three possible implementations have been given. The voltage levels in the converter and the parasitic capacitance to protective earth have to be taken into account to provide proper noise reduction.

Figure 11:
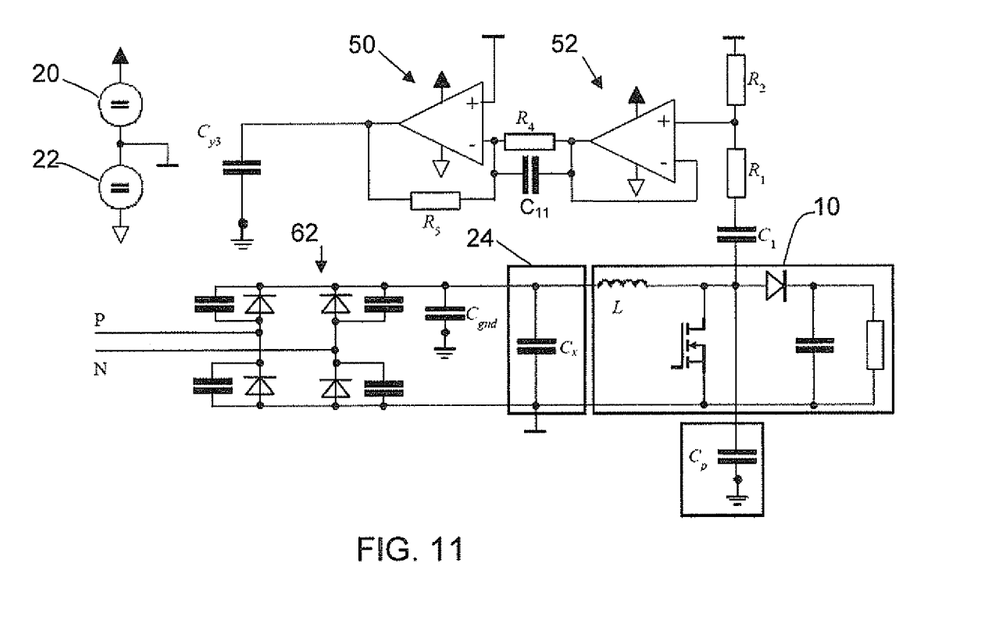
FIG. 11 shows Cm noise reduction with voltage sensing for a boost converter with supply source and sensing coupled to minus behind the bridge rectifier.

An implementation with only one or two y capacitors is shown in FIG. 11.

In this implementation, only the feeding stage for the correction signal to protective needs a y-capacitor. The circuits are referenced to the circuit ground instead of protective earth, and this makes the other y-capacitors unnecessary. In this embodiment not only the supply sources are referenced to circuit ground but also the sensing signal(s) are referenced to circuit ground. In this case, the phase lines P,N are shown applied to a bridge rectifier 62 which has bridge capacitors.

Figure 12:
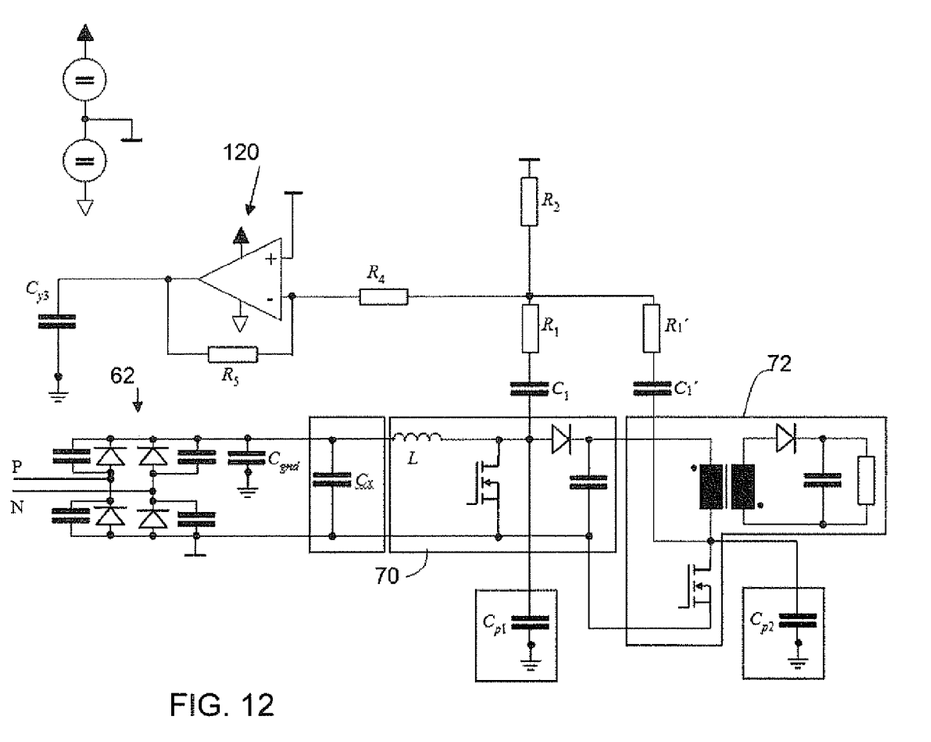
FIG. 12 shows Cm noise reduction with voltage sensing for two converters and only one amplifier for a boost and a flyback converter, with supply sources and sensing coupled to minus behind the bridge rectifier.

A final implementation is given in FIG. 12, showing the implementation with sensing of the noise of two converters, but using only one amplifier 120. This circuit combines the features of FIGS. 9 and 11. The phase lines P,N are again shown applied to a bridge rectifier 62 which has bridge capacitors.

The circuits above have injection points that are connected to the AC lines, to which also the LISN is connected. In the examples of FIGS. 11 and 12, there is a bridge in between, that blocks the injected current whenever the diode bridge is not conducting.

The lower rail (minus) of the rectified output then functions as the reference potential. As shown, the lower rail is connected between the power supplies 20,22 and to the one or two amplifier stages 50,52 or 120. FIG. 11 shows an example using a boost converter 10 and FIG. 12 shows an example using a boost converter stage 70 and a flyback converter stage 72.

The bridge capacitors in parallel to the bridge rectifier upfront are optional. However, these capacitors improve the performance of the filter.

The amplifier is shown as a two stage amplifier 50,52, which as in the examples above, comprises a non-inverting stage and an inverting stage. The inverting stage has gain defined by resistors R4, R5. A capacitor C11 might be provided between the two stages for additional phase correction.

The other examples of sensing strategies presented above can also be modified to use the lower rectified rail as reference point. Furthermore, the approach of FIG. 11 can also be applied to a power supply with different numbers and types of converter, as explained above in connection with FIG. 8, FIG. 9, or FIG. 10, with only one example in FIG. 12.

As shown in FIGS. 11 and 12, a capacitor $C_{gnd}$, which is implemented as a y capacitor, is connected to the higher rail (plus) (or it can be connected to the lower rail (minus)) and this can help to improve the filter due to better symmetry at frequencies where the active filter has to work.

The reference potential can instead be based on a dc bus.

The invention can be implemented as a simple circuit but is very effective. Only a few components are needed to achieve high attenuation, at least at lower frequencies. In addition, adjustment can be made easily by changing the values of resistors and/or capacitors.

In the examples above, some capacitors need to be implemented as y-capacitors (these have the suffix y, as in $C_{y1}$). The preferred design will depend on the application and can be a compromise between the circuit cost (y-capacitors are more costly) and the circuit performance.

Various modifications will be apparent to those skilled in the art.

The invention claimed is:

1. A noise filter circuit for a power converter comprising one or more stages, comprising:
    a sensor coupled to a switching node of the power converter at which a current is selectively routed through a switch of the power converter, wherein a voltage on the switching node comprises a switch waveform which gives rise to current noise as a result of parasitic capacitance between the power converter and ground;
    a processing stage electrically connected to the sensor and the power converter, wherein the processing stage is configured to process a sensor signal generated by the sensor and to provide a correction signal to a voltage line that is input into the power converter thereby to reduce the current noise.

2. The noise filter circuit as claimed in claim 1, wherein the voltage line comprises:
    a protective earth; or
    an ac neutral and/or ac phase line at an input to the converter; or
    a dc voltage supply line.

3. The noise filter circuit as claimed in claim 1, wherein:
    supply sources of the processing stage are referenced to protective earth, and the correction signal is provided to the voltage line comprising an ac neutral and/or ac phase line at an input to the converter or a dc voltage supply line.

4. The noise filter circuit as claimed in claim 1, wherein:
supply sources of the processing stage are referenced to an ac neutral or ac phase line at an input to the converter or a dc voltage supply line, and the correction signal is provided to protective earth.

5. The noise filter circuit as claimed in claim 1, wherein:
supply sources of the processing stage are referenced to a converter circuit ground, and the correction signal is provided to the voltage line comprising a protective earth.

6. The noise filter circuit as claimed in claim 1, wherein:
supply sources of the processing stage are referenced to circuit ground, the sensor is referenced to circuit ground, and the correction signal is provided to the voltage line comprising a protective earth.

7. The noise filter circuit as claimed in claim 1, wherein the sensor generates an output voltage dependent on the voltage at the switching node.

8. The noise filter circuit as claimed in claim 7, wherein the processing stage comprises a voltage amplifier and a feeding stage for injecting a current dependent on the voltage amplifier output thereby providing the correction signal to the voltage line.

9. The noise filter circuit as claimed in claim 1, wherein the sensor generates an output current dependent on the voltage at the switching node or its derivative.

10. The noise filter circuit as claimed in claim 9, wherein the processing stage comprises a current amplifier and a feeding stage for injecting a current dependent on the current amplifier output thereby providing the correction signal to the voltage line.

11. A power converter circuit comprising the noise filter circuit as claimed in claim 1 and the power converter.

12. The noise filter circuit as claimed in claim 11, wherein the power converter comprises a plurality of power converter stages.

13. The noise filter circuit as claimed in claim 12, wherein the noise filter circuit comprises a plurality of power converters, wherein each power converter has an associated sensor, and a combination of sensor signals generated by the power converters is processed by a shared processing stage.

14. The noise filter circuit as claimed in claim 1, comprising a bridge rectifier between ac phase and neutral lines and the converter.

* * * * *